US007286772B2

(12) United States Patent
Hwang

(10) Patent No.: US 7,286,772 B2
(45) Date of Patent: Oct. 23, 2007

(54) TONER MONITORING NETWORK PRINTER SYSTEM AND METHOD OF MONITORING A TONER CARTRIDGE THEREOF

(75) Inventor: Sun-kye Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 214 days.

(21) Appl. No.: 11/030,910

(22) Filed: Jan. 10, 2005

(65) Prior Publication Data

US 2005/0163514 A1 Jul. 28, 2005

(30) Foreign Application Priority Data

Jan. 26, 2004 (KR) ...................... 10-2004-0004739

(51) Int. Cl.
*G03G 15/00* (2006.01)
*G06F 15/00* (2006.01)

(52) U.S. Cl. ............................ 399/8; 399/12; 358/1.15

(58) Field of Classification Search .................... 399/8, 399/12, 24, 27; 358/1.1, 1.15
See application file for complete search history.

(56) References Cited

U.S. PATENT DOCUMENTS

| | | | | |
|---|---|---|---|---|
| 5,937,225 | A * | 8/1999 | Samuels | 399/27 |
| 6,324,351 | B1 * | 11/2001 | Kurimoto et al. | 399/12 |
| 6,549,732 | B2 * | 4/2003 | Yoshizaki et al. | 399/12 |
| 6,659,662 | B2 * | 12/2003 | Grohs | 400/76 |
| 6,807,907 | B2 * | 10/2004 | Yamada | 101/484 |
| 6,814,512 | B2 * | 11/2004 | Kato | 400/76 |
| 6,820,972 | B2 * | 11/2004 | Kinalski | 347/85 |
| 7,013,101 | B2 * | 3/2006 | Maruyama et al. | 399/109 |
| 2004/0220779 | A1 * | 11/2004 | Fukao | 702/188 |
| 2005/0019045 | A1 * | 1/2005 | Adkins et al. | 399/24 |
| 2005/0039091 | A1 * | 2/2005 | Hanaoka | 714/724 |
| 2005/0078969 | A1 * | 4/2005 | Kikuchi | 399/12 |
| 2005/0097198 | A1 * | 5/2005 | Getler et al. | 709/223 |

FOREIGN PATENT DOCUMENTS

| | | |
|---|---|---|
| JP | 2001-71533 | 3/2001 |
| JP | 2002-304268 | 10/2002 |
| KR | 2000-45097 | 7/2000 |

* cited by examiner

*Primary Examiner*—Vincent Q. Nguyen
*Assistant Examiner*—Hoai-An D. Nguyen
(74) *Attorney, Agent, or Firm*—Stanzione & Kim, LLP

(57) ABSTRACT

A toner monitoring network printer system and method of monitoring a toner cartridge thereof. A first network printer includes a communication module to communicate data with terminals through a network and to support communication with a second network printer, a toner residue computing part to compute a toner residue value of a toner cartridge based on a number of pages printed by the first network printer, a memory to store toner cartridge information including the toner residue value computed by the toner residue computing part, and a central processing device to control the communication module to provide the second network printer with the toner cartridge information including the toner residue value computed by the toner residue computing part, and to control the toner cartridge information including the toner residue value provided from a second network printer to be stored in at least one of the memory and the toner cartridge.

20 Claims, 4 Drawing Sheets

TONER MONITORING NETWORK PRINTER SYSTEM AND METHOD OF MONITORING A TONER CARTRIDGE THEREOF

CROSS-REFERENCE TO RELATED APPLICATIONS

This application claims the benefit of Korean Patent Application No. 2004-4739, filed on Jan. 26, 2004, in the Korean Intellectual Property Office, the disclosure of which is incorporated herein in its entirety and by reference.

BACKGROUND OF THE INVENTION

1. Field of the Invention

The present general inventive concept relates to a toner monitoring network printer system and a method of monitoring a toner cartridge thereof. More particularly, the present general inventive concept relates to a toner monitoring network printer system which is capable of broadcasting toner cartridge information anytime during the printing operations of network printers, thereby preventing a failure in accurately checking a toner residue value of a toner cartridge when a power supply is interrupted intentionally or accidentally.

2. Description of the Related Art

In general, a laser beam printer (hereinafter referred to as 'printer') performs a printing operation using an electrophotographic processing method. For the printing operation, the printer evenly charges a surface of an organic photoconductive drum using a rotating charge roller, and forms an electrostatic latent image, which is identical to an image output from a PC, on the charged surface of the organic photoconductive drum via a laser scan unit (LSU) which converts a digital signal to light. The electrostatic latent image formed on the organic photoconductive drum is developed by a toner via a developing device and is converted into a visible image. When a paper sheet, which is picked-up from a paper cassette by a pickup roller and fed into the printer, passes between transfer rollers, a backside surface of the paper sheet is charged with an opposite electric charge so that the visible image is transferred from the organic photoconductive drum to the paper sheet. The transferred image is fused onto the paper sheet due to heat and pressure as the paper sheet passes between a heating roller and a squeeze roller. The paper sheet is discharged along a pre-set conveyance path via a first discharge roller or a second discharge roller in a forward direction or a backward direction.

As shown in FIG. 1, a toner cartridge 20 mounted in the printer as described above comprises a cartridge memory 21 for storing information about the toner cartridge, and a memory module 23 for updating the information stored in the cartridge memory 21.

The information stored in the cartridge memory 21 is referred to as Cartridge Replace Unit Memory (CRUM) information, and it includes a serial number of the toner cartridge, a supplier of the toner cartridge, a toner residue value, and a toner state. Information about the serial number and supplier of the toner cartridge is not changeable because it is fixed during the manufacturing or supplying of the toner cartridge. However, the toner residue value of the toner cartridge is changeable in that it changes every time that a printing operation is performed at the request of a user. Based on the changed toner residue, the memory module 23 updates the information about the toner cartridge stored in the cartridge memory 21, including the toner residue value.

The toner residue value is computed by the printer. In order to manage the toner cartridge 20, as shown in FIG. 2, the printer comprises a printed page counter 135 for counting the number of printed pages, a toner residue computing part 137 for computing a toner residue value of the toner cartridge based on the number of printed pages, a non-volatile random access memory (NVRAM) 133 for storing the number of printed pages counted by the printed page counter 135 and the toner residue value computed by the toner residue computing part 137, an authentication part 132 for determining whether the mounted toner cartridge 20 is a genuine product, and a central processing device 131 informing a user of the toner residue value computed by the toner residue computing part 137 and stopping the printing operation when there is no toner residue remaining.

The toner residue computing part 137 obtains a total amount of consumed toner by multiplying an average amount of toner consumed per one paper sheet by the number of printed pages as counted by the printed page counter 135, and then, obtains the toner residue value by subtracting the total amount of consumed toner from a full amount of toner. The average amount of toner consumed per one paper sheet is a value that is determined through experiment and stored in memory.

Operation of the printer as described above is described hereinbelow with reference to FIG. 3.

When power is supplied to the printer (step S310), the central processing device 131 reads the CRUM information from the toner cartridge 20 (step S320), and the authentication part 132 determines whether the toner cartridge 20 is a genuine product based on the CRUM information (step S330). If the toner cartridge 20 is determined to be a genuine product by the authentication part 132, the central processing device 131 controls such that a printing operation is performed (step S340), and if not, it controls such that the printing operation is not performed (step S335).

Next, the central processing device 131 controls the printed page counter 135 and the toner residue computing part 137, respectively, to continuously count the number of printed pages and compute the toner residue value of the toner cartridge 20 (steps S350 and S360). The central processing device 131 stores the computed toner residue value in the NVRAM 133 (step S370). Next, when the printing operation is completed and a printer engine stops its operation (step S380), the central processing device 131 provides the toner cartridge 20 with the resulting toner residue value. The memory module 23 of the toner cartridge 20 stores in the cartridge memory 21 the resulting toner residue value provided from the printer to update the information about the toner residue (step S390).

The information about the toner residue stored in the cartridge memory 21 is maintained until it is updated as the next printing operation is performed. The CRUM information stored in the cartridge memory 21 is maintained even when the toner cartridge 20 is dismounted from the printer. On the other hand, the information stored in the NVRAM 133 of the printer disappears when the toner cartridge 20 is replaced with a new one. That is, the information stored the NVRAM 133 of the printer is updated with information on a newly mounted toner cartridge, and the toner residue computing part 137 computes a new toner residue value based on the number of pages printed by the newly mounted toner cartridge 20. The computed result of the toner residue is stored in both the NVRAM 133 of the printer and the newly mounted toner cartridge 20.

As described above, the printer stores only the information about the currently-mounted toner cartridge 20. The printer continuously computes the toner residue value during the printing operation, but cannot provide the resulting toner residue value to the toner cartridge 20 until the printing operation is completed. Therefore, if the printer's power supply is suddenly interrupted during the printing operation or if a user turns off the power intentionally to replace the toner cartridge 20 with a new one, the resulting toner residue value cannot be provided to the toner cartridge 20.

Monitoring the toner residue value is useful with respect to preventing the use of illegally-distributed toner or refill-dedicated toner made by a different manufacture. Users sometimes use illegally-distributed toner or a refill-dedicated toner instead of replacing spent cartridges with genuine toner cartridges 20. If the illegally-distributed toner or the refill-dedicated toner made by the different manufacturer is used, the printer, which is optimized for use with genuine toner, cannot achieve an optimal printing performance. Consequently, print quality deteriorates. Also, the illegally-distributed toner or the refill dedicated toner made by the different manufacturer causes an increase in the waste of toner remaining on the organic photoconductive drum, and thus, increases the waste toner collected in a waste-toner collection receptacle. However, because the waste-toner collection receptacle is suitable in size to the genuine toner, the waste toner overflows the waste-toner collection receptacle, which causes contamination to parts of the printer and thus reduces the lifespan of the printer and the parts of the printer.

In order to solve problems arising from the use of the illegally-distributed toner or the refill-dedicated toner, the printer takes an authentication procedure with respect to the toner cartridge 20 when power is supplied or the toner cartridge 20 is replaced with a new one. Specifically, when power is supplied to the printer or the toner cartridge is replaced with a new one, the printer reads the CRUM information from the cartridge memory 21 of the toner cartridge 20 to determine whether the toner cartridge 20 is a genuine product, and also whether the toner cartridge 20 has been refilled. If the toner cartridge is not determined to be a genuine product or it has been refilled, the printer controls such that the printing operation is not performed.

Whether the toner cartridge 20 is a genuine product is determined by identifying a serial number of the toner cartridge 20. Whether the toner cartridge 20 has been refilled is determined based on the toner residue value. As described above, the printer computes the toner residue value based on the number of printed pages and stores the computed toner residue value in the cartridge memory 21 of the toner cartridge 20. Therefore, even if the toner cartridge 20 is refilled, the CRUM information stored in the cartridge memory 21 still indicates that there is no toner remaining in the toner cartridge 20. Accordingly, the central processing device 131 determines that there is no toner residue in the toner cartridge 20 and stops the printing operation.

As described above, when the power supply is suddenly interrupted or a user turns off the power intentionally, the printer cannot provide the toner residue value as computed by the printer to the toner cartridge 20.

Sometimes a user intentionally turns off the power or dismounts the toner cartridge 20 before the printing operation is completely finished in order to refill the toner cartridge. Once this occurs, the toner cartridge 20 cannot be provided with the toner residue value according to the printing operation, and also, the CRUM information on the toner cartridge 20, including the toner residue value, is deleted. If the toner residue value is not recorded in the toner cartridge 20, the information stored in the cartridge memory 21 indicates that there is sufficient toner remaining in the toner cartridge 20, even if there is no toner remaining in the toner cartridge 20.

In this state, when a user refills the toner cartridge with the illegally-distributed toner or the refill-dedicated toner, the printer cannot recognize that the toner cartridge 20 has been refilled because the CRUM information of the toner cartridge 20 indicates there is toner remaining in the toner cartridge 20, and thus authenticates the toner cartridge 20.

As described above, illegally-distributed toner or refill-dedicated toner causes the lifespan of the printer and component parts thereof to be shortened. Illegally-distributed toner or refill-dedicated toner also deteriorates print quality. Accordingly, it is desirable to update the information on the toner residue even when the user turns off the power to the printer intentionally or accidentally.

SUMMARY OF THE INVENTION

The present general inventive concept has been developed in order to solve the above and/or other problems in the related art. The present general inventive concept provides a network printer system which is capable of updating a toner residue value of a toner cartridge when a printer's power supply is interrupted intentionally or accidentally, thereby preventing a reduction of lifespan of a printer or of the printer parts and a deterioration of print quality which arises from the use of illegally-distributed toner and refill-dedicated toner made by a different manufacturer.

The present general inventive concept also provides a method of monitoring a toner cartridge in a network system.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a network printer system, which has a first network printer and one or more second network printers communicably connected to one or more terminals. The first network printer comprises a communication module to communicate data with the terminals through a network and to support communication with the second network printers, a toner residue computing part or unit (or toner residue calculator) to compute a toner residue value of a toner cartridge based on a quantifiable measure of printing performed such as a number of pages printed by the network printer, a memory to store toner cartridge information which includes at least the toner residue value computed by the toner residue computing part, and a central processing device to, when a predetermined condition is satisfied, control the communication module to provide at least one of the second network printers with the toner cartridge information including the toner residue value computed by the toner residue computing part, and when toner cartridge information provided from at least one of the second network printers includes the most recent information on the currently-mounted toner cartridge, to control such that the toner cartridge information including the toner residue value provided from at least one of the second network printers is stored in at least one of the memory and the toner cartridge.

The toner cartridge information may further include a serial number of the toner cartridge, and the central processing device may determine whether the toner cartridge information provided from the second network printer coincides with the currently-mounted toner cartridge by comparing the serial number of the toner cartridge provided from the second network printer with the serial number stored in the currently-mounted toner cartridge.

The central processing device may compare the toner residue value provided from the second network printer with the toner residue value stored in the currently-mounted toner cartridge, and determine the one of the toner cartridge information provided from the second network printer and the toner cartridge information on the currently-mounted toner cartridge that indicates a lower toner residue value to be the most recent information.

The central processing device may provide at least one of the second network printers with the toner cartridge information including the toner residue value when power is supplied to the first network printer or when a cover of the first network printer is closed. Also, the central processing device may provide at least one of the second network printers with the toner cartridge information including the toner residue value at a predetermined interval.

The central processing device of the first network printer may provide at least one of the second network printers with the toner cartridge information in the form of a broadcast packet.

The network printer system may further comprise a printed pages counter to count a number of pages printed by the first network printer, and the central processing device may determine whether the information provided from at least one of the second network printers is the most recent information using the number of printed pages instead of, or in addition to, the toner residue values.

The foregoing and/or other aspects and advantages of the present general inventive concept may also be achieved by providing a method of monitoring a toner cartridge in a network printer system which comprises a first network printer and one or more second network printers connected communicably with one or more terminals. The method comprises: computing a toner residue value of a toner cartridge based on a quantifiable measure of printing performed (such as the amount of pages printed) by the first network printer, if a predetermined condition is satisfied, providing at least one of the second network printers with toner cartridge information including the toner residue value, determining whether toner cartridge information provided from at least one of the second network printers includes toner cartridge information coinciding with a currently-mounted toner cartridge, if it is determined that the toner cartridge information provided from at least one of the second network printers includes the toner cartridge information coinciding with the currently-mounted toner cartridge, selecting the most recent information of the toner cartridge information provided through the network and the information stored in the currently-mounted toner cartridge, and if the toner cartridge information provided through the network is determined to be the most recent information, updating the toner cartridge information stored in the currently-mounted toner cartridge with the toner cartridge information provided through the network.

The toner cartridge information may further include a serial number of the toner cartridge, and the method may further comprise determining whether the toner cartridge information provided from at least one of the second network printers includes toner cartridge information coinciding with the currently-mounted toner cartridge by comparing the serial number of the toner cartridge provided from at least one of the second network printers with the serial number stored in the currently-mounted toner cartridge.

The operation of selecting the most recent information may comprise comparing the toner residue value provided from at least one of the second network printers with the toner residue value stored in the currently-mounted toner cartridge, and determining the one of the toner cartridge information provided from at least one of the second network printers and the toner cartridge information stored in the currently-mounted toner cartridge that indicates a lower toner residue value to be the most recent information.

The operation of providing at least one of the second network printers with the toner cartridge information including the toner residue value may be performed when power is supplied to the first network printer or when a cover of the first network printer is closed. Alternatively, this operation may be performed at a predetermined interval.

The toner cartridge information may be communicated between printers in the form of a broadcast packet.

The method may further comprise counting a number of pages printed by the first network printer, wherein the number of printed pages is used to determine whether the toner cartridge information provided from at least one of the second network printers is the most recent information.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
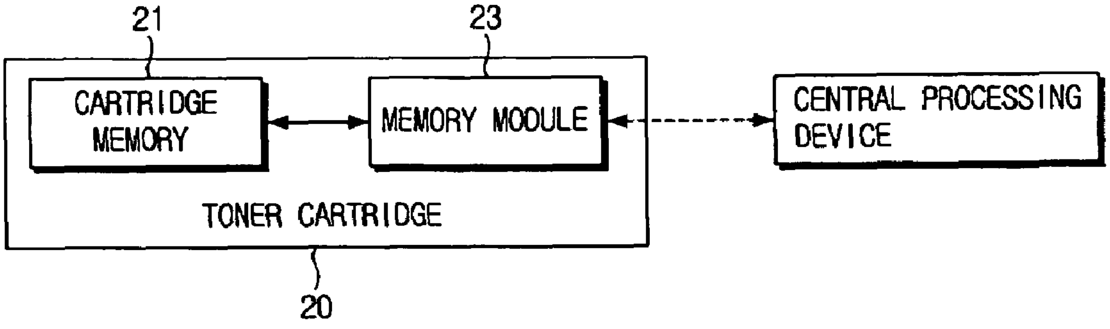
FIG. 1 (PRIOR ART)
FIG. 1 is a block diagram illustrating a conventional toner cartridge.
Figure 2:
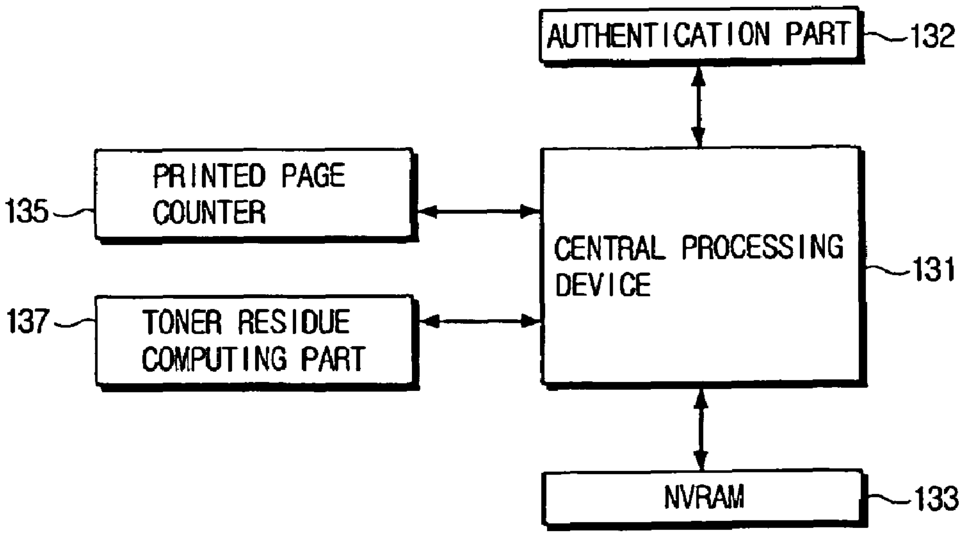
FIG. 2 (PRIOR ART)
FIG. 2 is a block diagram illustrating a printer employing the toner cartridge of FIG. 1.
Figure 3:
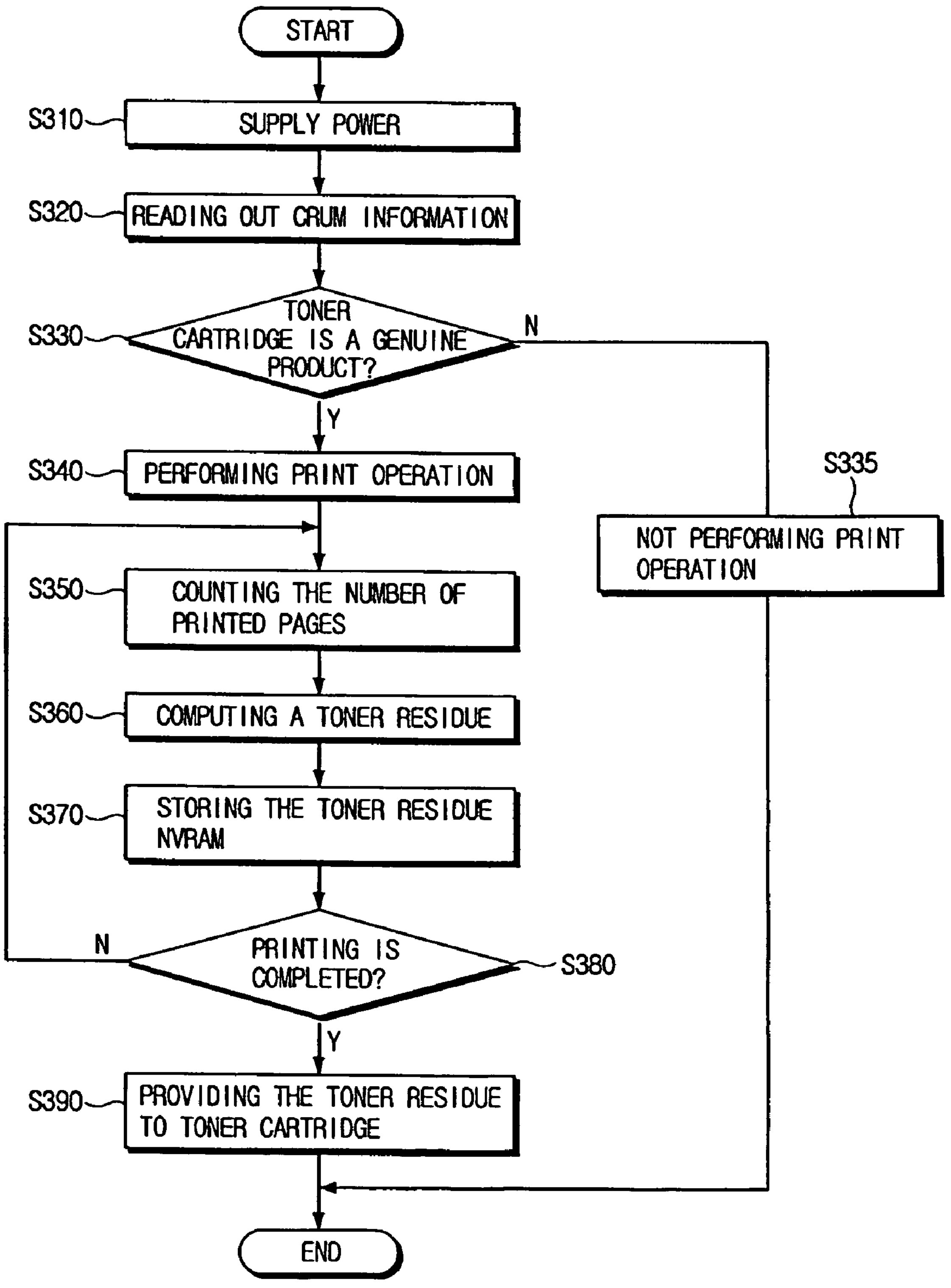
FIG. 3 (PRIOR ART)
FIG. 3 is a flowchart illustrating operation of the printer of FIG. 2.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Throughout this disclosure, the term network refers to any type of network that is linkable in a wired or wireless manner. For example, the network may take the form of a local area network (LAN), a wide area network (WAN), a network in which like or similar LANs are linked to one another via a bridge, a network in which different LANs are linked to one another via a gateway, and/or a wireless network such as Bluetooth. Therefore, a network printer, which will be described below, is enabled to communicate with other network printers within the same LAN, and also to communicate with a remote network printer.

Figure 4:
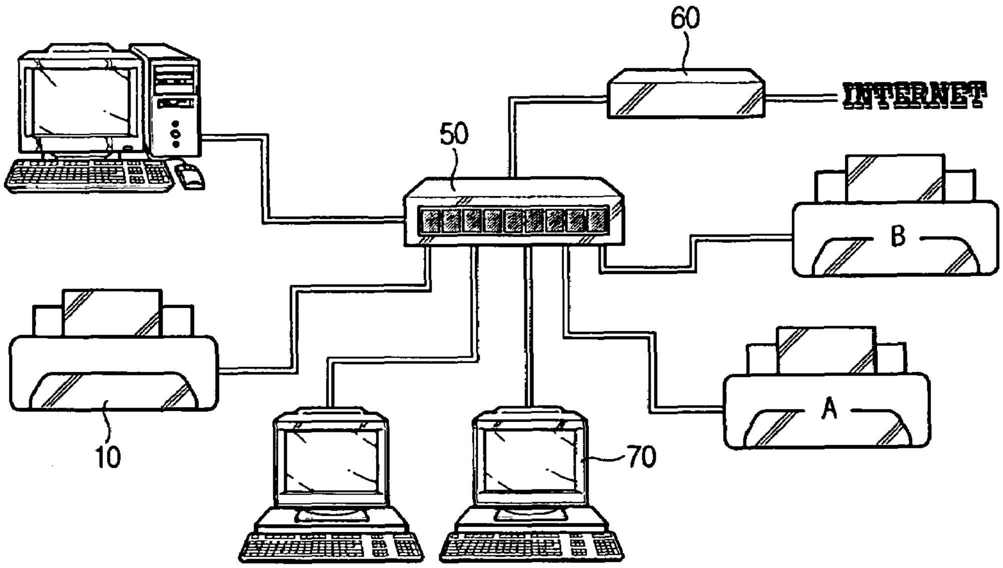
FIG. 4 is a schematic representation of a network printer system according to an embodiment of the present general inventive concept.
Figure 5:
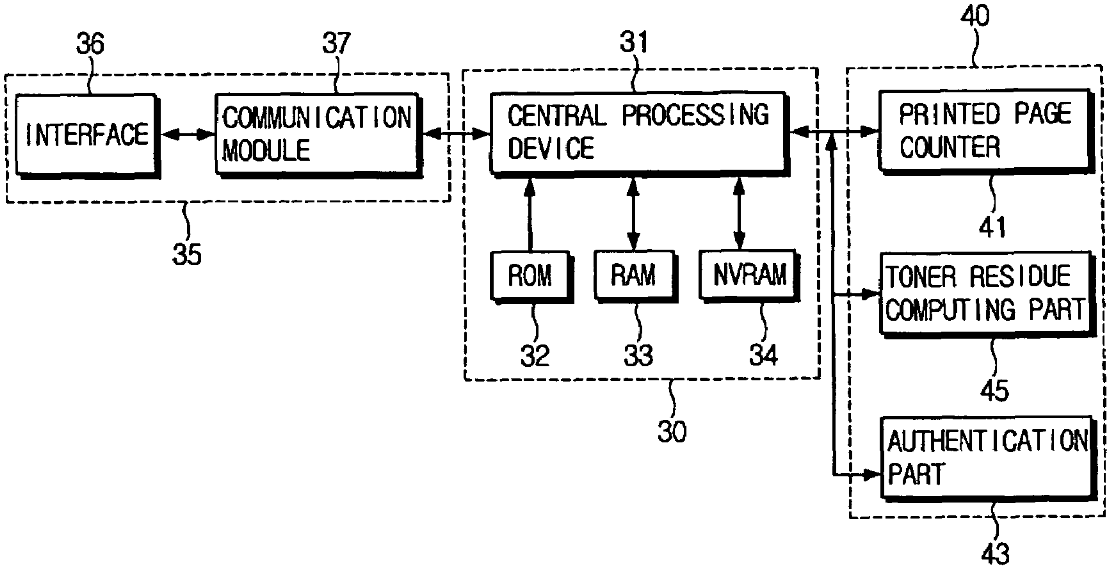
FIG. 5 is a block diagram illustrating a network printer according to an embodiment of the present general inventive concept.
Figure 6:
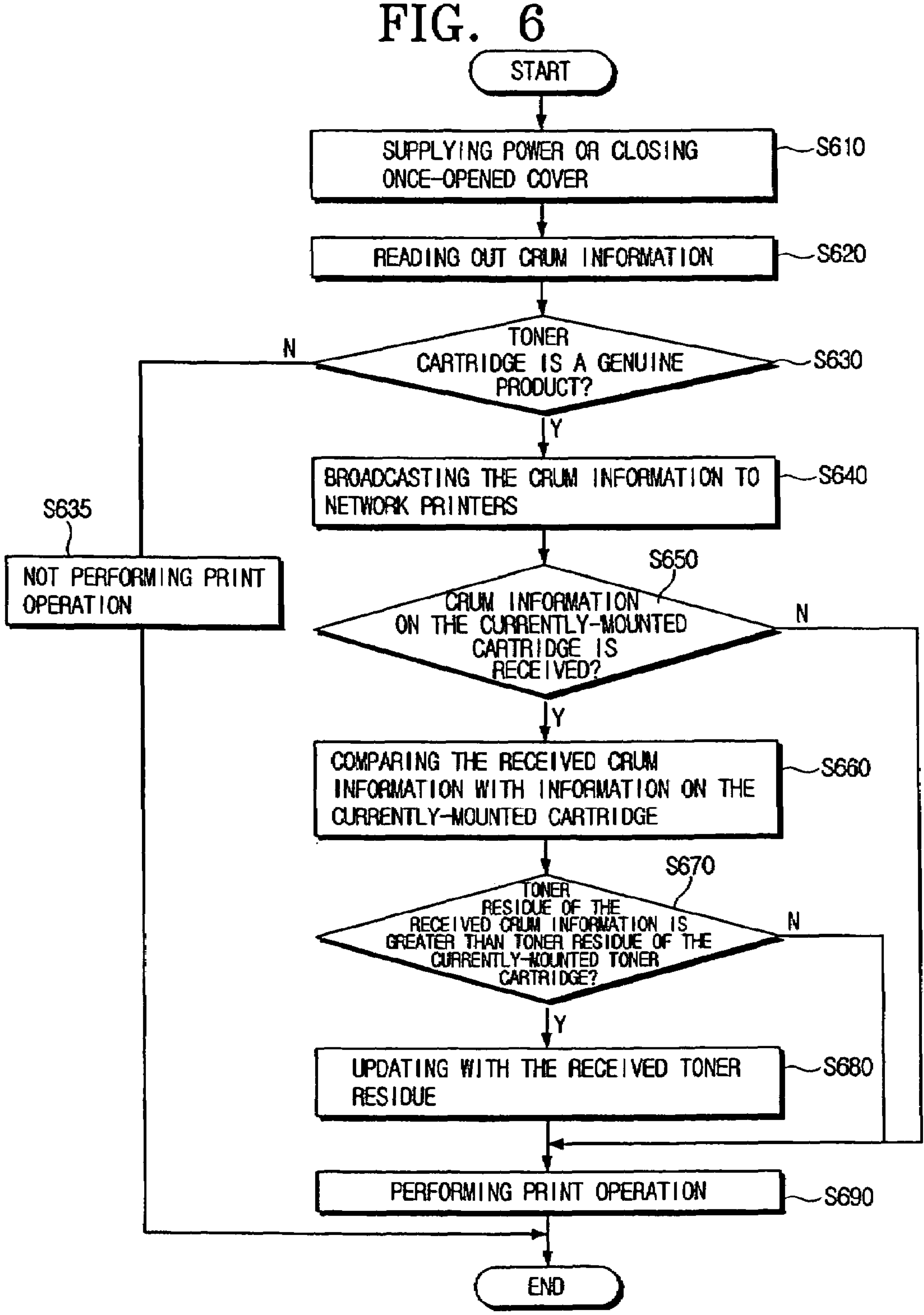
FIG. 6 is a flowchart illustrating a method of monitoring a toner cartridge in a network printer system according to an embodiment of the present general inventive concept.

FIG. 4 is a schematic representation of a network printer system according to an embodiment of the present general inventive concept.

The network printer system of FIG. 4 comprises a plurality of network printers 10, each installing therein a network card or integrating the function of the network card into a board, communicably connected to one another through a network, and a plurality of terminals 70 communicably connected to the network printers 10. The respective network printers 10 and terminals 70 are connected to a hub 50 and networked for mutual communications. The hub 50 is connected to a router 60 to communicate with external networks, such as a LAN or the Internet.

The network printers 10, which are connected to one another through the network, transmit and receive CRUM information of toner cartridges 20 mounted therein through continuous communications, and thereby share CRUM information.

As shown in FIG. 1, the toner cartridge 20 mounted in each network printer 10 generally comprises a cartridge memory 21 to store the CRUM information about the toner cartridge 20 and a memory module 23 to update the CRUM information stored in the cartridge memory 21.

The CRUM information stored in the cartridge memory 21 may include a serial number and a supplier of the toner cartridge 20, a number of printed pages, a toner residue value, and a toner state. Since information on the serial number and supplier of the toner cartridge 20 has been stored during the manufacturing or supplying of the toner cartridge 20, it is not changeable. However, information on the number of printed pages and the toner residue value are changed whenever a printing operation is performed at the request of a user, and are updated by the memory module 23 and stored in the cartridge memory 21.

In order to manage the toner cartridge 20, each network printer 10 comprises a cartridge management block 40 to manage the CRUM information of the toner cartridge 20, a communication block 35 to communicate with other network printers 10, and a control block 30 to control the cartridge management block 40 and the communication block 35.

The control block 30 comprises a read-only memory (ROM) 32 to store a program which is necessary for the operation of the network printer 10 and a network protocol to communicate data, a random access memory (RAM) 33 to temporarily store print data and inner data, a NVRAM 34, which is a flash memory, to store the CRUM information including the number of printed pages counted by a printed page counter 41 and a toner residue value computed by a toner residue computing part (or toner residue calculator) 45, and a central processing device 31 to control computation and overall operation of the network printer 10.

An appropriate network protocol may include TCP/IP, IPX/SPX, Apple Talk, Socket, and/or NetBEUI. The ROM 32 stores a network protocol that supports the currently-established network.

The communication block 35 comprises a communication module 37 to transmit and receive data through a wired or wireless network, and an interface 36 to interface data communicated between the central processing device 31 and an input/output device, and/or to interface data communicated among the network printers 10.

The communication module 37 supports the communication of data among the network printers 10 using various communication protocols, and may employ a unicast method, a multicast method, and/or a broadcast method to communicate the data. The data may be communicated in packets by each of these methods. The unicast method is used to selectively communicate data with a specific receiver. According to the unicast method, a terminal 70 designates a specific network printer 10 and communicates data with the designated network printer. The multicast method is used to share data within a pre-set group. The broadcast method is used to communicate data with all receivers connected to the network. According to the broadcast method, a network printer 10 or a terminal 70 which is connected to the network recognizes the location of a corresponding receiver. The network printer system of this particular embodiment may utilize a broadcast packet to communicate the CRUM information of the toner cartridges 20 among network printers 10.

The cartridge management block 40 comprises a printed page counter 41 to count the number of printed pages, a toner residue computing part 45 to compute a toner residue value of the toner cartridge 20 based on the number of printed pages, and an authentication part 43 to determine whether the toner cartridge 20 is a genuine product.

The toner residue computing part 45 computes a total amount of consumed toner by multiplying an average amount of toner consumed per one page by the number of printed pages counted by the printed page counter 41, and then obtains a toner residue value by subtracting the total amount of consumed toner from a full amount of toner of the toner cartridge 20.

The authentication part 43 determines whether the mounted toner cartridge 20 is a genuine product by comparing a serial number read from the toner cartridge 20 with a pre-stored serial number of a genuine toner cartridge when power is supplied to the printer or a cover of the printer is opened and closed to replace the toner cartridge 20 with a new one. If the authentication part 43 determines that the toner cartridge 20 is a genuine product, the central processing device 31 allows a printing operation. If not, the central processing device does not perform the printing operation.

The central processing device 31 continuously counts the number of printed pages during the printing operation of the network printer 10, computes the toner residue value of the toner cartridge 20, and stores the information on the computed toner residue value in the NVRAM 34 in real time. When the printing operation is completed and the operation of the printer engine stops, the central processing device 31 provides the toner cartridge 20 with the resulting toner residue value so that the memory module 23 of the toner cartridge 20 may update the cartridge memory 21 with the resulting toner residue value provided from the network printer 10.

Meanwhile, the central processing device 31 causes a broadcast of the CRUM information on the toner cartridge 20 currently mounted in the network printer 10 through the communication module 37 when a specific event occurs and/or at a predetermined interval. The broadcasted information includes a serial number of the toner cartridge 20, the number of printed pages, the toner residue value, a toner state, and a supplier of the toner cartridge 20, which are read from the NVRAM 34. In this embodiment, the specific event refers to the case where power is supplied to the network printer 20 or the cover of the network printer 10 is opened and closed to replace the toner cartridge 20.

When the CRUM information on the toner cartridges 20 is broadcasted to a certain network printer 10, the central processing device 31 of the certain network printer 10 determines whether the broadcasted CRUM information provided from one of the other network printers 10 includes CRUM information on the toner cartridge 20 currently installed in the certain network printer. If the toner cartridge 20 has not been replaced, the broadcast packet or packets provided from the other network printer or printers 10 likely does not include the CRUM information on the toner cartridge 20 mounted in the certain network printer 10. For example, if a toner cartridge of network printer B is replaced with a toner cartridge A which was previously mounted in network printer A, the broadcast packet provided from network printer A includes CRUM information on the toner cartridge A which is currently mounted in the network printer B.

When receiving the broadcast packet including the information on the currently-mounted toner cartridge A, the central processing device 31 of the network printer B compares the CRUM information of toner cartridge A received via the broadcast packet with the CRUM information stored in the currently-mounted toner cartridge A. If the information provided from the network printer A is determined to be more recent information as a result of the comparison, the central processing device 31 of the network printer B stores the more recent information in the NVRAM 34, and simultaneously, provides it to the memory module 23 of the toner cartridge A so that the memory module 23 updates the information and stores the updated information in the cartridge memory 21. On the other hand, if the information provided from the network printer A is older than the CRUM information stored in the toner cartridge 20 of the network printer B, the CRUM information provided through the network is ignored.

Determining which information is the most recent information of the CRUM information provided from the network printer A and the CRUM information stored in the current toner cartridge 20 is accomplished by comparing a toner residue value included in the broadcast packet with a toner residue value stored in the cartridge memory 21 of the currently-mounted toner cartridge A. If the toner residue value included in the broadcast packet is less than the toner residue value stored in the cartridge memory 21, it is determined that the CRUM information of the toner cartridge 20 is not updated due to an intentional or accidental power supply interruption. In this case, the central processing device 31 updates the information in the cartridge memory 21 with the information included in the broadcast packet.

A process of monitoring CRUM information of a toner cartridge 20 in the network printer system with the above construction is described hereinbelow.

In a network printer system as described above, the CRUM information of the respective toner cartridges 20 are broadcast among the respective network printers 10 in real time during the operations of the network printers 10. The network printers 10 each perform a printing operation at the request of a user. When the printing operation is performed, the printed page counter 41 counts the number of printed pages, and the toner residue computing part 45 computes a toner residue value based on the number of printed pages in real time. The central processing device 31 continuously updates the CRUM information on the number of printed pages and the toner residue value and stores this information in the NVRAM 34. Even when the printer's power supply is suddenly interrupted during the printing operation, the CRUM information on the number of printed pages counted right before the power supply is interrupted and the toner residue value computed based on the number of printed pages are maintained because the central processing device 31 keeps updating the information and storing it in the NVRAM 34. When the printing operation is completed and the printer engine is stopped, the central processing device 31 provides the toner cartridge 20 with the CRUM information on the number of printed pages counted during the printing operation and the computed toner residue value, and stores the CRUM information in the cartridge memory 21.

When power is re-supplied to the network printer 10 after being shut off or when a cover is closed after being opened (operation S610), the central processing device 31 receives the CRUM information stored in the cartridge memory 21 of the currently-mounted toner cartridge 20 through the memory module 23 (operation S620). The CRUM information on the toner cartridge 20 received by the central processing device 31 includes a serial number of the toner cartridge 20, the number of printed pages, the toner residue value, a toner state, and a supplier name. The central processing device 31 provides the CRUM information on the toner cartridge 20 to the authentication part 43, and the authentication part 43 determines whether the currently-mounted toner cartridge 20 is a genuine product with reference to the serial number (operation S630).

If the toner cartridge 20 is not determined to be a genuine product, the central processing device 31 prevents the printer engine from performing the printing operation (operation S635). Meanwhile, if the toner cartridge 20 is determined to be a genuine product, the central processing device 31 broadcasts the CRUM information provided from the toner cartridge 20 to the other network printers 10 connected through the network (operation S640).

When a certain network printer 10 receives CRUM information from another network printer 10, the central processing device 31 of the certain network printer 10 determines whether the broadcasted and received CRUM information includes CRUM information on its own currently mounted toner cartridge 20 (operation S650). This may be accomplished by the central processing device 31 by comparing a serial number of the toner cartridge 20 included in the broadcast packet with a serial number of the currently-mounted toner cartridge 20.

If the broadcast packet does not include CRUM information on the currently-mounted toner cartridge 20, it is determined that the toner cartridge 20 has not been replaced. In this case, the network printer 10 performs a general printing operation at the request of a user (operation S690).

However, if the certain network printer 10 determines the broadcast packet includes the CRUM information on its own currently-mounted toner cartridge 20, it is determined that the toner cartridge 20 has been replaced. In this case, the central processing device 31 compares the CRUM information included in the broadcast packet with the CRUM information provided from the cartridge memory 21 of the currently-mounted toner cartridge 20 (operation S660). If the number of printed pages included in the broadcast packet is greater than the number of printed pages provided from the toner cartridge 20, or if the toner residue value included in the broadcast packet is less than the toner residue value provided from the toner cartridge 20 (operation S670), the central processing device 31 stores in the NVRAM 34 the number of printed pages and the toner residue value provided from the broadcast packet. Simultaneously, the central processing device 31 provides the CRUM information on the number of printed pages and the toner residue value to the memory module 23 of the mounted toner cartridge 20, thereby allowing the memory module 23 to update the information and store it in the cartridge memory 21.

The toner residue value provided from the broadcast packet may be greater than the toner residue value stored in the toner cartridge 20. This may mean that the network printer 10 sending the broadcast packet does not reflect its newly mounted toner cartridge 20 and still has the CRUM information on the previously-mounted toner cartridge 20. This also may mean that the network printer receiving the broadcast packet has updated the CRUM information on the number of printed pages and the toner residue value of the newly-mounted toner cartridge 20, and after a printing operation has been performed using the newly-mounted toner cartridge 20, the CRUM information on the toner residue has been updated in the cartridge memory 21 of the toner cartridge 20.

If each network printer authenticates the toner cartridges 20 and updates the CRUM information stored in the toner cartridge 20 by exchanging the CRUM information on the toner cartridge 20, the central processing device 31 controls such that normal printing operation is performed (operation S690).

As described above, when power is supplied to a network printer or when the cover is closed after being opened, each network printer 10 receives the broadcast packet including the CRUM information of the toner cartridge 20 at a predetermined interval. For example, a first network printer broadcasts the information stored in NVRAM 34 thereof before its own toner cartridge 20 is replaced with a new one, thereby providing the CRUM information stored in the NVRAM 34 to a second network printer 10 where the toner cartridge, having been mounted in the first network printer, is now mounted. Accordingly, when a user interrupts the power supply intentionally and accidentally, which results in the information on the number of printed pages and the toner residue value not being updated, even if the toner cartridge 20 of the first network printer is mounted in the second network printer 10, the second network printer 10 receives the broadcast packet including the information on the number of printed pages and the toner residue value from the first network printer, thereby preventing the information from not being updated.

Accordingly, since it is impossible to distort the information on the printed pages and the toner residue value stored in a toner cartridge, the present general inventive concept can prevent the use of an illegally-distributed toner cartridge or refill dedicated toner made by a different manufacturer. Therefore, the present general inventive concept prevents deterioration of print quality which is caused by the use of illegally-distributed toner cartridges or refill dedicated toner and a reduction of the lifespan of network printers or parts of network printers which is caused by an overflow of waste toner.

Although in a laser printer was described by way of an example in the present general inventive concept, this should not be considered as limiting. The present general inventive concept can be applied to any image forming apparatus, such as an inkjet printer, if it has developing means capable of being refilled with toner or ink or capable of being replaced with a new toner cartridge.

According to the present general inventive concept, since the respective network printers 10 share CRUM information including the number of printed pages and toner residue value, failures in updating the CRUM information on the toner cartridges 20 can be prevented. Therefore, since it is impossible to distort the information on the number of printed pages and the toner residue value stored in the toner cartridge 20, the present general inventive concept can prevent the deterioration of print quality which arises from the use of the illegally-distributed toner or refill dedicated toner. The present general inventive concept can also prevent the reduction of a lifespan of a network printer or parts of a network printer which is caused by the overflow of waste toner.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A network printer system comprising a first network printer and at least one second network printer communicably connected to one or more terminals, wherein the first network printer comprises:

a communication module to communicate data with the terminals through a network and to support communication with the at least one second network printer;

a toner residue computing unit to compute a toner residue value of a toner cartridge based on a number of pages printed by the first network printer;

a memory to store toner cartridge information which includes the toner residue value computed by the toner residue computing unit; and a central processing device to, when a predetermined condition is satisfied, control the communication module to provide the at least one second network printer with the toner cartridge information, and when the toner cartridge information provided from the at least one second network printer includes the most recent information on a currently-mounted toner cartridge, to control the toner cartridge information provided from the at least one second network printer to be stored in at least one of the memory and the currently mounted toner cartridge.

2. The network printer system as claimed in claim 1, wherein the toner cartridge information further includes a serial number of the toner cartridge, and wherein the central processing device determines whether the toner cartridge information provided from the at least one second network printer coincides with the currently-mounted toner cartridge by comparing the serial number of the toner cartridge provided from the at least one second network printer with the serial number stored in the currently-mounted toner cartridge.

3. The network printer system as claimed in claim 1, wherein the central processing device compares the toner residue value provided from the at least one second network printer with the toner residue value stored in the currently-mounted toner cartridge, and determines the toner cartridge information provided from the at least one second network printer and the toner cartridge information on the currently-mounted toner cartridge that indicates a lower toner residue value to be the most recent information.

4. The network printer system as claimed in claim 1, wherein the central processing device provides the at least one second network printer with the toner cartridge information when power is supplied to the first network printer or when a cover of the first network printer is closed.

5. The network printer system as claimed in claim 1, wherein the central processing device provides the at least one second network printer with the toner cartridge information at a predetermined interval.

6. The network printer system as claimed in claim 1, wherein the central processing device of the first network printer provides the at least one second network printer with the toner cartridge information in the form of a broadcast packet.

7. The network printer system as claimed in claim 1, further comprising a printed pages counter to count a number of pages printed by the first network printer, wherein the central processing device determines whether the information provided from the at least one second network printer is the most recent information using the number of printed pages.

8. The network printer system as claimed in claim 1, wherein the first network printer further comprises:

a cartridge management block to manage the toner cartridge information;

a communications block to communicate with the at least one second network printer; and a control block to control the cartridge management block and the communications block.

9. The network printer system as claimed in claim 8, wherein the cartridge management block comprises:

a printed page counter to count a number of pages printed by the first network printer;

the toner residue computing unit; and an authentication part to determine whether the toner cartridge is genuine.

10. The network printer system as claimed in claim 9, wherein the toner cartridge information further comprises the number of pages printed by the first network printer.

11. The network printer system as claimed in claim 1, wherein the toner residue computing unit computes the toner residue value by subtracting a total measure of consumed toner from a full measure of toner, wherein the total measure of consumed toner is computed my multiplying an average amount of toner used per printed page by the number of pages printed by the first network printer.

12. The network printer system as claimed in claim 9, wherein the authentication part determines whether the toner cartridge is genuine by comparing a serial number of the toner cartridge with a known genuine serial number.

13. The network printer system as claimed in claim 1, wherein the central processing device continuously counts the number of pages printed and stores the toner cartridge information in the memory in real time.

14. A method of monitoring a toner cartridge in a network printer system which comprises a first network printer and at least one second network printer connected communicably with one or more terminals, the method comprising:

computing a toner residue value of a toner cartridge based on an amount of pages printed by the first network printer;

if a predetermined condition is satisfied, providing the at least one second network printer with toner cartridge information including at least the toner residue value;

determining whether toner cartridge information provided from the at least one second network printer includes toner cartridge information coinciding with a currently-mounted toner cartridge;

if it is determined that the toner cartridge information provided from the at least one second network printer includes the toner cartridge information coinciding with the currently-mounted toner cartridge, selecting the most recent information of the toner cartridge information provided through the network and the information stored in the currently-mounted toner cartridge; and if the toner cartridge information provided through the network is determined to be the most recent information, updating the toner cartridge information stored in the currently-mounted toner cartridge with the toner cartridge information provided through the network.

15. The method as claimed in claim 14, wherein the toner cartridge information further includes a serial number of the toner cartridge, and wherein the method further comprises determining whether the toner cartridge information provided from the at least one second network printer includes toner cartridge information coinciding with the currently-mounted toner cartridge by comparing the serial number of the toner cartridge provided from the at least one second network printer with the serial number stored in the currently-mounted toner cartridge.

16. The method as claimed in claim 15, wherein the selecting of the most recent information comprises comparing the toner residue value provided from the at least one second network printer with the toner residue value stored in the currently-mounted toner cartridge, and determining the one of the toner cartridge information provided from the at least one second network printer and the toner cartridge information stored in the currently-mounted toner cartridge that indicates a lower toner residue value to be the most recent information.

17. The method as claimed in claim 14, wherein the operation of providing the at least one second network printer with the toner cartridge information is performed when power is supplied to the first network printer or when a cover of the first network printer is closed.

18. The method as claimed in claim 14, wherein the operation of providing the at least one second network printer with the toner cartridge information is performed at a predetermined interval.

19. The method as claimed in claim 14, wherein the toner cartridge information is provided to the at least one second network printer in the form of a broadcast packet.

20. The method as claimed in claim 14, further comprising counting a number of pages printed by the first network printer, wherein the number of printed pages is used to determine whether the toner cartridge information provided from the at least one second network printer is the most recent information.

* * * * *